Patented Dec. 11, 1923.

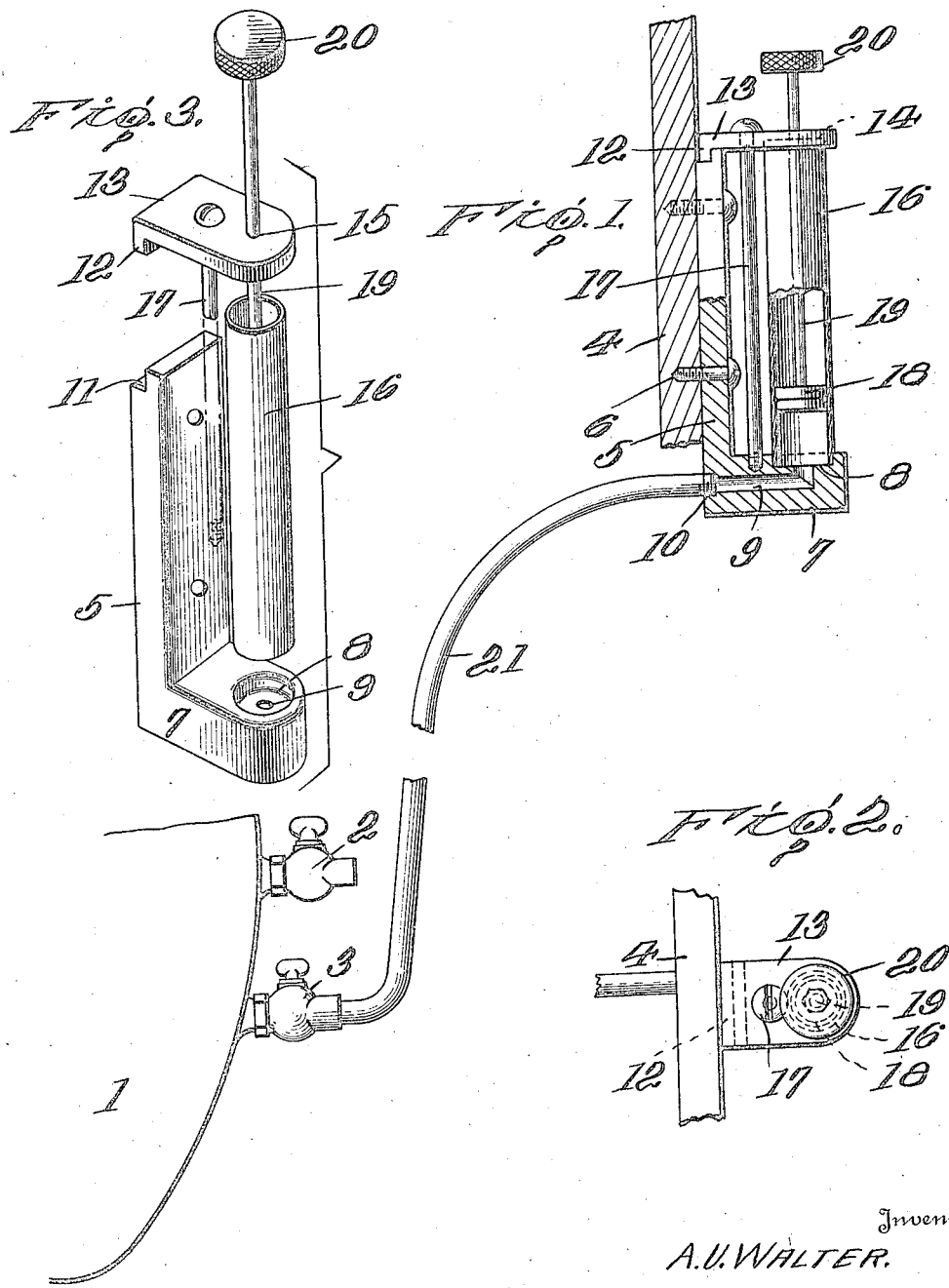

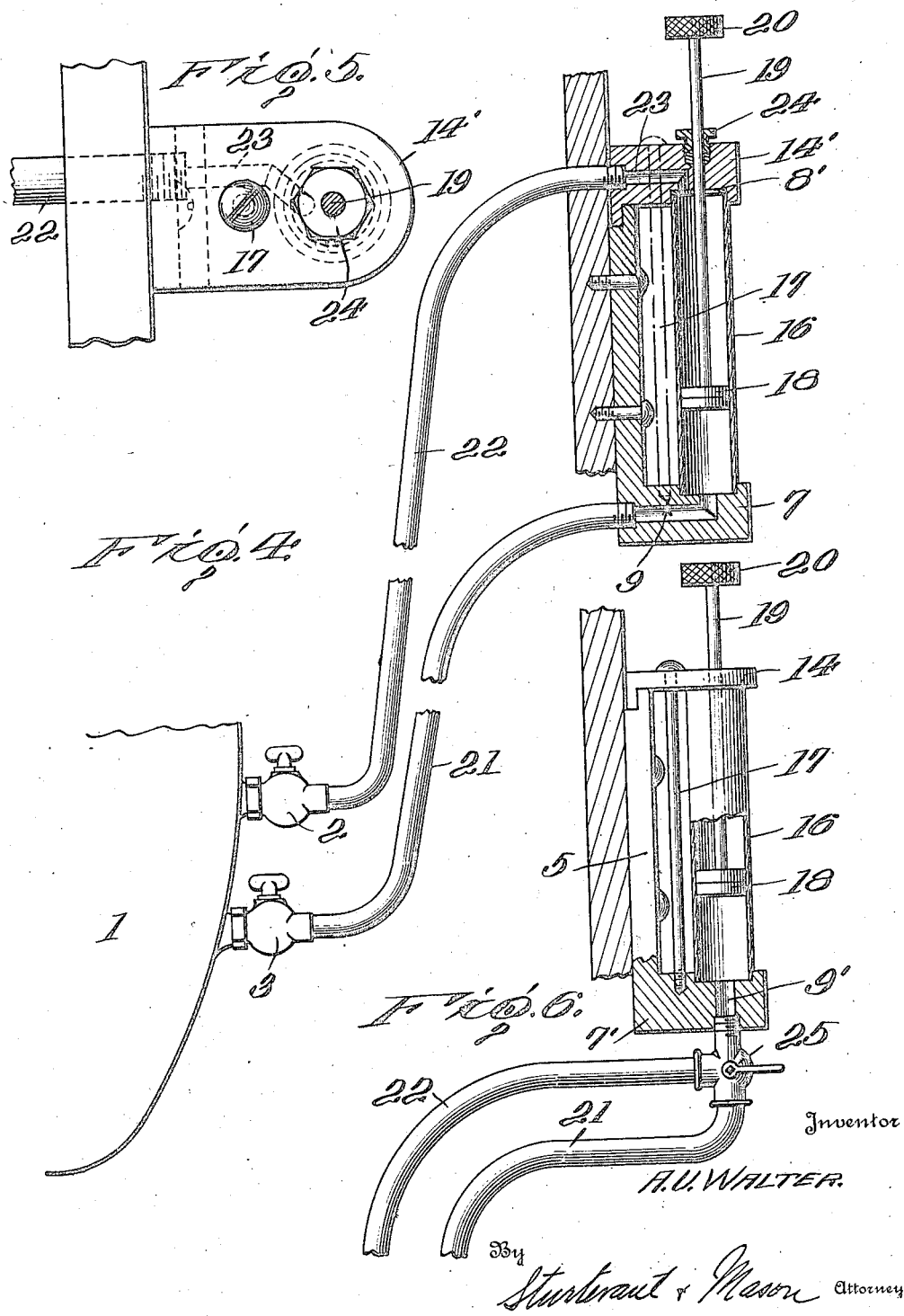

1,477,403

UNITED STATES PATENT OFFICE.

ALBERT U. WALTER, OF BALTIMORE, MARYLAND, ASSIGNOR TO CHARLES ADAMS BUCHANAN SHREVE, OF BALTIMORE, MARYLAND.

LIQUID-LEVEL INDICATOR.

Application filed November 22, 1921. Serial No. 516,972.

*To all whom it may concern:*

Be it known that I, ALBERT U. WALTER, a citizen of the United States, residing at Baltimore, State of Maryland, have invented certain new and useful Improvements in Liquid-Level Indicators, of which the following is a description, reference being had to the accompanying drawing and to the figures of reference marked thereon.

This invention relates to liquid level indicators, and more particularly to devices for indicating the supply of liquid in a tank or reservoir.

The main object resides in providing a device which will conveniently and quickly indicate whether or not a sufficient supply of lubricant, gasolene or other liquid is present in a particular reservoir.

Another object of this invention resides in providing a cheap and simple oil indicating attachment adapted to be applied to the dash, or other convenient portion, of an automobile which will quickly operate to indicate the presence of a sufficient quantity of lubricant in the engine crank case.

Still another object of this invention resides in providing a simple assembly of a bracket and pump construction adapted for attachment to the dash and for connection to an oil level indicating outlet or outlets in the crank case of an automobile.

These and other objects will in part be obvious and will in part appear from a perusal of the following specification taken in connection with the accompanying drawings, in which—

Figure 1 is a view partly in section of the assembly;

Figure 2 is a plan view of the bracket and plunger pump;

Figure 3 is a perspective view of the bracket and pump;

Figure 4 is a view of a modification;

Figure 5 is a plan view thereof; and

Figure 6 is a view of still another modification.

In general, the invention consists in providing the dash or other convenient portion of the automobile with a pump having a small chamber or reservoir connecting with a predetermined liquid level, outlet or outlets in a liquid tank, such, for instance, as the crank case of the engine, so that when the pump is operated by hand, it will draw oil or other liquid from the reservoir to the pump chamber, if such oil or liquid is not below the predetermined level.

Referring now more particularly to the drawings, the invention for convenience of illustration is shown as attached to the crank case of a Ford automobile, which, as is well known, is provided with the upper and lower oil drain pet cocks 2 and 3, respectively. The level of the lubricating oil in the crank case is generally maintained midway between these two pet-cocks. At the present time with no attachment when it is desired to ascertain the quantity of oil in the crank case, the upper and lower petcocks are successively operated to let the oil flow out, thereby determining the oil level. In order to do this, the operator must either reach way under the machine or must get out and read a gauge located on the lower pet-cock.

The present attachment for easily accomplishing this consists of a bracket adapted to be attached to the dash or other portion of the automble. This bracket, in its preferred form, comprises an L-shaped portion 5, the vertical part of which is screwed, as at 6, to the dash, as illustrated. The base part 7 of the L-shaped portion is formed with a circular recess 8, the bottom of which communicates as by a conduit 9 with the exit 10 on the exterior of the bracket. The upper portion of the L-shaped bracket 5 is shouldered as at 11, to receive a depending flange 12 on a cap or top portion 13 of the bracket. This cap 13 is likewise formed with a circular recess 14 and a perforation or bore 15. The base and cap portions of the bracket receive and clamp between them an open-ended transparent tube 16, the opposite open ends seating in the circular recesses. In order to hold the bracket and tube in assembled relation, a screw 17 passes through the cap 13 and into the base 7. A pump plunger 18 which is formed with the usual double washer, one for the upstroke and the other for the down-stroke, works within the transparent tube 16 and is provided with a rod 19 passing through the bore 15 of the cap 13. The upper end of the plunger rod 19 is provided with a suitable handle 20. A tube 21 connects the exit 10 of the base with one of the pet-cocks 2 or 3 of the crank case, so that when the plunger 18 is raised by the operator, the oil, if at the level of the pet-cock, will be at once transferred up to the glass cylinder on the dash and is then, if desired, immediately returned to the crank case by pushing the plunger down. Thus the operator knows at a glance that there is sufficient lubricant in the crank case. If no oil comes up, the tank must be filled to the desired point.

Figures 4 and 5 show the invention in connection with a double acting pump cylinder and plunger, wherein the opposite ends of the cylinder are respectively connected to the upper and lower pet-cocks 2 and 3. The construction of the pump cylinder in this modification is identical to the single acting pump of Figure 1 except that the upper cap 14' is provided with a circular seat corresponding to the circular seat 8 of the base member 7. The cap 14' is also provided with a bore or passageway 23 connecting with the circular seat and connecting with a tube 22 screwing into, or otherwise attaching, to the conduit 23. Where the plunger 19 passes through the upper cap 14', it is provided with a packing 24 of any desired type. Pipe 22 connects with the upper pet-cock 2. In the operation of this modified form of invention, if oil is at the level of the upper pet-cock 2, when the plunger is pushed down, oil will be sucked into the upper end of the cylinder 16, whereas if oil is only at the level of the lower pet-cock 3, oil will not be drawn into the upper end of the cylinder. On the other hand, when the plunger 19 is raised, the oil will be sucked up through the pipe 21 into the lower end of the cylinder.

In the modification shown in Figure 6, the double pipe connection 21 and 22 can be used in connection with the single acting pump of Figure 1, by providing the two-way valve connection 25 communicating with the passage 9' in the base 7'. By this two-way valve either the pipe 21 or the pipe 22 can be put in communication with the lower working end of the cylinder 16.

It is, of course, clear that the invention herein is not only applicable to an automobile, but also to tanks or reservoirs in general. Furthermore, it is not only applicable for indicating the lubricating oil supply, but also the gasolene supply or other liquid supply.

It is again obvious that while the preferred form of pump is illustrated and described, other types of pumps may be used and other connections to the desired tank or reservoir availed of. The present construction is illustrated because it embodies a simple, cheap attachment easily assembled in place and not liable to get out of working order.

It is obvious that minor changes in the details of construction and arrangement of parts may be made without departing from the spirit of the invention as set forth in the appended claims.

Having thus described my invention, what I claim as new and desire to secure by Letters Patent, is:

1. In a device of the class described, the combination of the engine crank case of an automobile provided with an oil level indicating exit disposed at a predetermined oil level, a pump having a visible pump chamber disposed on said automobile in convenient reach of the driver, a conduit connecting said exit and pump, said pump being constructed and arranged to lift at will a portion of the oil in said crank case into the pump chamber.

2. A device adapted for connection to an oil level indicating pet-cock communicating with the crank case of an automobile, including a bracket adapted to be attached to a convenient portion of the automobile substantially above the level of the crank case, said bracket comprising separable base and cap portions, a transparent tube adapted to have its opposite open ends seat on said base and cap portions, means adapted to clamp said base and cap portions and said tube in assembled relation, a pump plunger passing through a perforation in said cap and operable in said tube, said base having a passage therethrough connecting with the open end of the tube, and a conduit connecting said passage with said pet-cock opening.

3. In a device of the class described, in combination with the crank case of an automotive vehicle, a pump adapted to be attached to the dash board or other convenient point above the level of oil in the crank case, said pump including a transparent cylinder, means establishing communication between opposite ends of said cylinder with oil exits located at predetermined oil levels in the crank case, whereby when said pump is operated in one direction a portion of said oil is transferred into the pump cylinder from one oil exit and when operated in the opposite direction, oil is transferred into the pump cylinder from the other side.

In testimony whereof, I affix my signature.

ALBERT U. WALTER.